Dec. 18, 1962
H. C. MEINERS
3,069,349
HYDROCARBON ISOMERIZATION PROCESS
Filed June 16, 1958
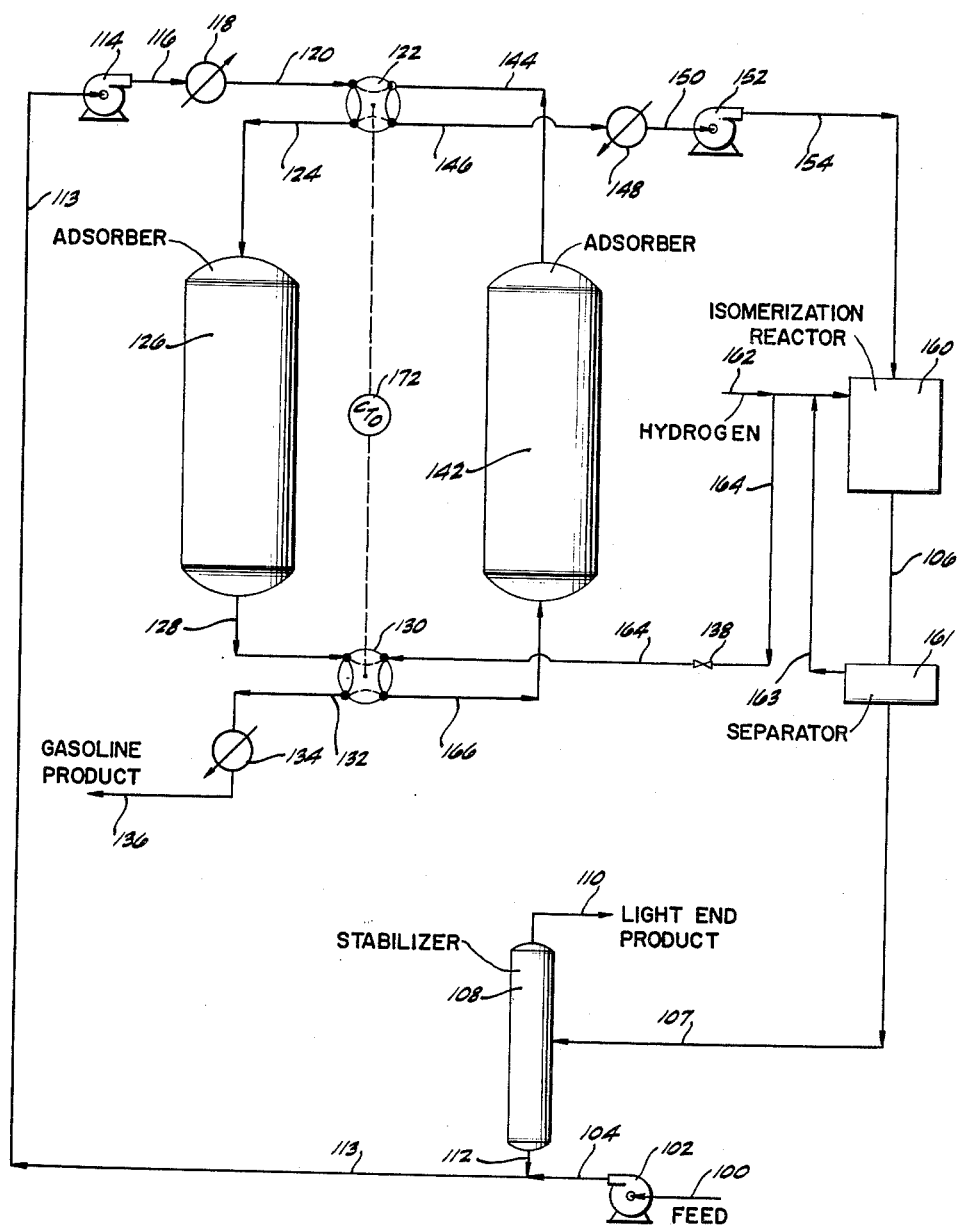
INVENTOR.
HENRY C. MEINERS,
BY
Richard C. Hochman
ATTORNEY.

United States Patent Office 3,069,349
Patented Dec. 18, 1962

3,069,349
HYDROCARBON ISOMERIZATION PROCESS
Henry C. Meiners, Palos Verdes Estates, Calif., assignor to Union Oil Company of California, Los Angeles, Calif., a corporation of California
Filed June 16, 1958, Ser. No. 742,287
15 Claims. (Cl. 208—85)

This invention relates to the isomerization of hydrocarbons, and in particular concerns an improved process for treating hydrocarbon mixtures comprising straight-chain and branched-chain hydrocarbons to convert the straight-chain components into more valuable branched-chain compounds.

In the refining of petroleum to produce high octane gasoline, it is common practice to upgrade hydrocarbon mixtures by subjecting them to an isomerization reaction whereby the straight-chain components of the mixture are converted into branched-chain compounds having higher anti-knock ratings. Since the isomerization operation is effective only with respect to straight-chain compounds, it is of course desirable that the feed stream to the isomerization be rich in this type of compound, i.e., it is desirable that the original mixture be pretreated in some manner to separate the straight-chain components and that only the latter be subjected to the isomerization treatment. Such pre-treatment can be effected by contacting the mixture with a molecular sieve type adsorbent, whereby the straight-chain hydrocarbons are selectively adsorbed and the branched-chain compounds are obtained as a non-adsorbed raffinate. However, the most practical method for recovering the adsorbate from the rich adsorbent involves the use of a stripping gas; consequently, the desired straight-chain hydrocarbons are obtained contaminated with the stripping gas rather than in a substantially pure form best suited for the isomerization reaction. Separation of the stripping gas contaminant constitutes an additional step which is both expensive and inconvenient.

It is accordingly an object of the present invention to provide an improved process for improving the anti-knock rating of hydrocarbon mixtures which comprise both straight-chain and branched-chain components.

Another object is to provide a hydrocarbon isomerization process in which a hydrocarbon feed mixture is pretreated to obtain a product which is fed directly to the isomerization reaction.

A further object is to provide a hydrocarbon isomerization process in which a feed mixture comprising branched-chain and straight-chain hydrocarbons is treated by selective adsorption to obtain a rich adsorbent containing the straight-chain components, and the rich adsorbent is stripped in a particular manner employing a stripping gas which is introduced into the isomerization reactor in admixture with the desorbed straight-chain hydrocarbons and which performs a specific and necessary function during the isomerization reaction.

I have now found that the foregoing objects and their attendant advantages can be realized in an isomerization process in which a feed mixture comprising straight-chain and branched-chain hydrocarbons is treated with a molecular sieve type adsorbent to obtain a rich adsorbent containing substantially only the straight-chain components of the feed mixture; the rich adsorbent is then subjected to a combination of reduced pressure and stripping with hydrogen to desorb the adsorbed straight-chain hydrocarbons, and the latter in admixture with the hydrogen stripping gas is subjected to isomerizing conditions. More particularly, I have found that straight-chain hydrocarbons contained in a rich molecular sieve type adsorbent can advantageously be desorbed by first reducing the pressure on the rich adsorbent to effect partial desorption and then gas-stripping the partially depleted adsorbent with hydrogen, and that the resulting mixture of desorbed straight-chain hydrocarbons and hydrogen constitutes an excellent feed stream for isomerization. The hydrogen contained in such feed stream serves to suppress side reactions, cracking, coking, etc., in the isomerization operation, but is not appreciably consumed therein. Consequently, the hydrogen can be recovered from the isomerizate, i.e., the isomerization reactor effluent, and returned to the desorption step for reuse as the stripping gas. Usually, only a part of the recovered hydrogen is returned to the desorption step, and the remainder is recycled within the isomerization step. In its preferred embodiment the invention thus consists in the process for treating a hydrocarbon mixture comprising straight-chain and non-straight-chain hydrocarbons of the gasoline boiling range to increase the anti-knock qualities thereof, which process essentially comprises (1) an adsorption step wherein said hydrocarbon mixture is contacted in vapor phase with a solid granular adsorbent of the molecular sieve type, whereby there is produced a non-absorbed raffinate gas comprising the branched-chain, or high anti-knock, components of the mixture and a rich adsorbent containing the straight-chain, or low anti-knock, components of the feed mixture; (2) a desorption step in which the aforesaid rich adsorbent is first placed under reduced pressure to effect a partial desorption of the adsorbed straight-chain hydrocarbons, and is then stripped with hydrogen to complete the desorption; and (3) an isomerization step in which the effluent from the desorption step, comprising hydrogen and the straight-chain hydrocarbon components of the original mixture, is subjected to conditions under which the latter are isomerized to branched-chain hydrocarbons of high anti-knock value.

Considering now the process of the invention in further detail, it is generally applicable to the treatment of hydrocarbon mixtures comprising both straight-chain and branched-chain hydrocarbons. Since the adsorption step of the process is also capable of separating straight-chain hydrocarbons from naphthenic and aromatic hydrocarbons, the process feed mixture may also contain compounds of the latter type. Usually the feed mixture is of the gasoline boiling range (comprising hydrocarbons ranging in molecular weight from $C_4$ to about $C_{10}$) and is of petroleum origin, although the process is adapted to the treatment of hydrocarbon mixtures derived from coal tar, oil shale, tar sands and the like. Straight-run gasolines and other straight-run fractions, cracked gasolines, reformed gasolines from reforming or aromatization processes and light gas oils may all be processed in accordance with the invention.

As stated, the initial step of the process is an adsorption step in which the feed mixture is contacted with a solid granular molecular sieve type adsorbent. The latter is a partially dehydrated zeolitic metallo alumino silicate having pores of substantially uniform diameter. Certain naturally occurring minerals, e.g., faujasite, chabazite, analcite and gmelinite can be partially dehydrated to obtain such type of silicate, but I greatly prefer to employ synthetic products. Such products are conveniently prepared by heating stoichiometric quantities of alumina and silica with an excess of sodium hydroxide under pressure and thereafter washing out the excess caustic. The sodium alumino silicate zeolite so prepared is then partially dehydrated to obtain a product having substantially uniform pores of about 4 A. in diameter and having a composition corresponding substantially to $[Na_2O \cdot Al_2O_3 \cdot (SiO_2)_2]$ on a water-free basis. This type of product is available commercially from the Linde Company under the trade name "Molecular Sieves 4A." Zeolitic adsorbents of the present type having pores of diameter greater than about 4 A. are conveniently obtained by exchanging part of the sodium cation with other metals. For example, the sodium zeolite prepared as just described is treated with a concentrated solution of a calcium salt, e.g., calcium chloride, at super-atmospheric pressure and at 150–300° C., washed with water to remove excess calcium chloride, and thereafter partially dehydrated by heating to obtain a synthetic zeolitic calcium sodium alumino silicate having substantially uniform pores of about 5 A. in diameter and having an approximate composition corresponding to $[CaO \cdot Al_2O_3 \cdot (SiO_2)_2]_{0.7}[Na_2O \cdot Al_2O_3 \cdot (SiO_2)_2]_{0.3}$ on a water-free basis. This particular product is likewise available commercially from the Linde Company under the trade name "Molecular Sieves 5A." Cations other than calcium may be similarly introduced into the material by ion exchange to obtain adsorbents of the present class having pores whose diameters differ slightly according to the identity of such cations. Further details regarding the manner of preparing the present type of adsorbent are to be found in British Patent No. 777,232.

As is known, the molecular sieve type of adsorbent exerts preferential adsorptive forces on those hydrocarbon molecules whose minimum dimensions are equal to or slightly less than the diameter of the pores of the adsorbent. Thus, the straight-chain paraffins and olefins, which have cross-chain dimension of about 4–5 A., are strongly and readily adsorbed by adsorbents having pore diameters of about 5 A., e.g., Linde "Molecular Sieves 5A." However, the branched-chain paraffins and olefins, naphthenes and aromatic hydrocarbons all have minimum molecular dimensions in excess of 5 A., and are hence substantially non-adsorbable on 5 A. adsorbents. The latter are thus selective for the separation of the straight-chain hydrocarbons from the non-straight-chain hydrocarbons. The adsorbent employed in the present process should have a pore diameter between about 4.5 A. and about 5.5 A.

The optimum particle size of the adsorbent depends upon the manner in which it is used in the process, e.g., as a fixed compact bed, as a moving compact bed, as a fluidized bed, etc. Usually, however, the particle size is between about 2 and about 400 mesh, preferably between about 4 and about 30 mesh for fixed and moving compact beds and between about 100 and about 300 mesh for fluidized beds.

The adsorbent is preferably employed in the form of a dense compact fixed or moving bed which is alternately subjected to the adsorption and desorption steps of the process. In the simplest embodiment of the invention, the adsorbent is employed in the form of a single static bed in which case the process is only semi-continuous. Preferably, a set of two or more static beds is employed with appropriate valving so that the feed stream is passed through one or more adsorbent beds while one or more of the other beds in the set is undergoing desorption. The direction of gas flow during adsorption and desorption is either up or down through the adsorbent; preferably, it is in one direction during adsorption and in the opposite direction during desorption. Any of the apparatus and techniques conventionally employed in static or moving bed fluid-solids contacting may be used.

As previously stated, the adsorption step is carried out in the vapor phase. Thus, the temperature is at least as high as the dew point of the feed mixture at the particular pressure employed. Usually the feed stream is vaporized prior to being introduced into the adsorption zone, although it may be vaporized within the zone itself. The pressure is usually near atmospheric, but may be superatmospheric. In general, the vapor phase adsorption is carried out at temperatures between about 100° F. and about 800° F., preferably between about 150° F. and about 650° F., and at pressures between atmospheric and about 1,000 p.s.i.a. preferably between about 20 p.s.i.a. and about 200 p.s.i.a. As is herein- after more fully disclosed, the adsorption step is preferably carried out over a limited period of time, e.g., five minutes or less. The immediate products of the adsorption step are a rich adsorbent containing adsorbed straight-chain hydrocarbons and a non-adsorbed or raffinate stream comprising the branched-chain, naphthenic and aromatic components of the feed mixture. The raffinate thus contains all of the high anti-knock components of the feed, and may be employed directly as a gasoline blending stock or the like or may be combined with the isomerizate product of the process.

The desorption step is carried out in two stages, the first of which comprises reducing the pressure on the rich adsorbent, whereby there is obtained an extract effluent which is rich in the straight-chain hydrocarbon components selectively adsorbed in the previous adsorption cycle, and a partially desorbed adsorbent containing an equilibrium amount of the straight-chain hydrocarbon adsorbate. In the second stage, the partially desorbed adsorbent is gas-stripped with hydrogen. The latter reduces the partial pressure of the straight-chain hydrocarbons essentially to zero, so that substantially all of the adsorbate is recovered in admixture with hydrogen and the lean adsorbent is obtained substantially free of straight-chain hydrocarbons. Consequently, when the lean adsorbent is employed in the adsorption step of the next succeeding cycle of operation, the raffinate stream will be substantially free of straight-chain hydrocarbons.

Both stages of the desorption step are carried out in the vapor phase. Thus, the temperature during desorption is at least as high as the boiling point of the highest boiling component of the desorption effluent at the particular reduced pressure employed. In general, the reduced pressure desorption is carried out at temperatures between about 150° F. and about 800° F. An important feature of a preferred embodiment of the process lies in the fact that it is carried out essentially isothermally, i.e., with adsorption and desorption being effected at substantially the same temperature. In such isothermal adsorption and desorption the feed temperature determines the average bed temperatures in both steps, with a temperature rise above the feed temperature occurring in the adsorption step from the heat of adsorption and a temperature lowering during the desorption step caused by the heat of desorption. This temperature swing will usually be less than about 50° F., depending, of course, on the size of the bed, feed composition, feed rate, and other such process variables.

The lowest total pressure reached during desorption should be less than about 10 p.s.i.a., and is preferably between about 0.2 p.s.i.a. and about 2 p.s.i.a. The lower the pressure reached during desorption, the greater overall adsorbate capacity available but the lower the overall efficiency of the compressor. The use of a stripping gas such as hydrogen to complete the second stage of desorption is particularly advantageous in reducing the compression requirements for desorption. Conventional compressors are available which will reach suction pressures ranging from about one to about two p.s.i.a. with comparative ease. If it is desirable to reduce the pressure of the desorption step further, then the use of conventional compression becomes uneconomical and requires specially designed vacuum compressors. Also, with conventional compressors, a point is reached where the low suction pressure prevents any further gas removal and the compressor is essentially compressing and expanding the same volume of gas. The use of a stripping gas at this point allows the compressor to efficiently perform work on the system while reducing the partial pressure of the adsorbate components to a pressure approaching the partial pressure of these components in the stripping gas. For example, an adsorbent evacuated to 1 p.s.i.a. with conventional compression will be in equilibrium with a 1 p.s.i.a. partial pressure of the adsorbate. If a stripping gas containing none of the adsorbate components is then added, the system will approach equilibrium with a system having a zero partial pressure of adsorbate. Thus, in the desorption step, the combination of a vacuum desorption first stage, with a subsequent gas-stripping second stage allows economic adsorptive separation and produces streams of exceptional purity while utilizing a much greater part of the adsorbent capacity than conventionally possible.

The adsorption and desorption steps of this invention are thus cyclic operations involving saturating a bed of adsorbent with straight-chain hydrocarbons and then desorbing the adsorbate by a combination of reduced pressure and gas-stripping. Although the process is operable with a single adsorbent bed, usually two or more beds are operated cyclically to provide a continuous flow of products from the adsorption and desorption steps. When the adsorbent in the adsorption step approaches saturation with the straight-chain hydrocarbons selectively adsorbed from the feed mixture, the operations are reversed and the rich adsorbent bed is transferred to the desorption step. Simultaneously, the lean adsorbent bed of a desorption step is transferred to the adsorption step. Generally, the adsorption and desorption steps are of the same duration, but the process of the invention is operable with varying times for adsorption and desorption.

A preferred embodiment of this invention employs radically short cycle times for both adsorption and desorption, usually less than about ten minutes each. Such short cycle time allows the utilization of unusually small adsorbent beds, thus reducing the capital investment in adsorption equipment, the capital investment in adsorbents, and the problems of regeneration of a deactivated adsorbent bed. Means are usually provided in adsorptive separation systems for periodic reactivation of the solid adsorbent, as by contacting with a hot reactivating gas such as flue gas, air, or a mixture of these. A small adsorbent bed allows rapid regeneration, usually by high-temperature oxidation, with a relatively short time exposure of the adsorbent to the severe conditions of regeneration, whereas in a large adsorbent bed the initially reactivated adsorbent must be exposed to the high temperature conditions required for the subsequent reactivation of the remainder of the bed.

As stated, it is preferred that the flow direction of the hydrogen stripping gas in the desorption step be opposite from that of the flow of feed gas in the adsorption stage. Such mode of operation takes advantage of the inherent displacement exchange occurring when the lighter straight-chain hydrocarbons flow through the bed and displace the heavier straight-chain hydrocarbons. Thus, during the adsorption step, when, for example, the feed enters at the top of the adsorber and leaves at the bottom, the adsorbent at the top contains a high proportion of the heavier straight-chain hydrocarbons and the adsorbent at the bottom contains a high proportion of the lighter straight-chain hydrocarbons. Then, in the first stage of the desorption step, by reversing the flow, i.e., by removing the desorbed effluent from the top of the bed, the high concentration of light straight-chain hydrocarbons released from the adsorbent at the bottom of the bed flows upwardly through the bed and displaces the heavier straight-chain hydrocarbons as desorption progresses. Then, when the desired low pressure is attained, the partially desorbed adsorbent contains essentially the lightest straight-chain hydrocarbon originally in the feed. This then establishes an environment in which the stripping gas is much more effective since the lighter straight-chain hydrocarbons adhere less strongly to the adsorbent than do the heavier straight-chain hydrocarbons.

As stated, the desorption step produces a first stage effluent comprising substantially only desorbed straight-chain hydrocarbons and a second stage effluent comprising stripped straight-chain hydrocarbons in admixture with hydrogen. In the third step of the process these two effluents are combined and are subjected to isomerizing conditions whereby the straight-chain hydrocarbons undergo rearrangement to form branched-chain isomers, e.g., normal pentane is converted to isopentane. The isomerization of hydrocarbons is well-known, and any of the conventional processes can be used. Usually, the isomerization operation consists of passing the feed, at a liquid hourly space velocity between about one and about ten, in admixture with hydrogen flowing at a rate of about 100 s.c.f./bbl. to the 5,000 s.c.f./bbl., over an isomerization catalyst at an elevated temperature between about 700° F. and 1,100° F and a pressure between about 30 p.s.i.g., and 5,000 p.s.i.g. Typical isomerization catalysts are noble metal-acid base catalysts, e.g., platinum on a halide-promoted alumina carrier or palladium on an acidized alumina silica carrier. Alternately, the isomerization may be carried out at lower temperatures, e.g., between about 200° F. and about 400° F., employing acidic or Friedel-Crafts catalysts, such as aluminum chloride, aluminum sulfate, hydrogen fluoride, and aluminum bromide.

During the isomerization operation, a portion of the hydrocarbons usually undergo a number of other reactions including dehydrogenation, aromatization, cracking, etc., in which a small amount of hydrogen is consumed. Also, a small amount of hydrogen dissolves in the isomerization. Accordingly, it is usually necessary to provide a small amount of make-up hydrogen which can be introduced into the system at any suitable point.

The effluent from the isomerization reactor usually contains some relatively low molecular weight hydrocarbons produced during the isomerization operation. These low molecular weight hydrocarbons, e.g., propane, butane and isobutane, are preferably seperated by distillation and are produced as a light-end, product stream of the process. Such removal of light ends is conventionally known as stabilization.

According to a preferred modification of the process, the process feed, e.g., a heavy straight-run naphtha, a light straight-run naphtha, a catalytically or thermally cracked naphtha, is combined with the isomerizate, either before or after any stabilization of the latter, and the combined product is employed as the feed to the adsorption step. By operating in this manner, the adsorption step is employed to separate unconverted straight-chain hydrocarbons from the isomerizate as well as to separate straight-chain hydrocarbons from the process feed. When employing such modifications, the raffinate or unadsorbed stream from the adsorption step constitutes the net process product.

The following example, described in connection with the drawing which accompanies and forms a part of this specification, will illustrate several ways in which the principles of the invention may be applied but are not to be construed as limiting the same.

EXAMPLE

Referring to the accompanying drawing, which is in the form of a schematic flow sheet illustrating a simple embodiment of the invention, a fresh naphtha feed stream which comprises a light straight-run gasoline having the following composition:

*Fresh Naphtha Feed Composition*

| Component: | Mol percent |
| --- | --- |
| n-Butane | 1.2 |
| Iso-pentane | 17.7 |
| n-Pentane | 22.5 |
| Iso-hexane | 19.4 |
| n-Hexane | 16.6 |
| Iso-heptane | 3.4 |
| Cyclics and aromatics | 19.1 |
| | 100.0 | is introduced into the system via line 100 and is passed by pump 102 through line 104 at the rate of 560 mols/hr. This fresh feed stream thence flows into line 113 where it is combined with the stabilized isomerization reactor effluent which flows into line 113 via line 112 and which is the bottoms stream from stabilizer column 108. The combined stream, which constitutes the feed stream to the adsorption step of the process, has the following composition.

*Adsorber Feed Composition*

| Component: | Mol percent |
| --- | --- |
| Iso-pentane | 22.5 |
| n-Pentane | 24.5 |
| Iso-hexane | 22.7 |
| n-Hexane | 14.4 |
| Iso-heptane | 2.3 |
| Cyclics and aromatics | 13.6 |
|  | 100.0 |

The adsorber feed stream flowing in line 113 is passed by pump 114 to feed heater 118 via line 116 at a rate of about 980 mols/hr. The stream is vaporized in feed heater 118 at a temperature of about 600° F. under an autogenic pressure of about 75 p.s.i.a. The hot adsorber feed thence passes via line 120 through four-way valve 122 and line 124 into the top of first adsorber 126. The latter contains a 72,600-lb. fixed bed of a solid granular calcium sodium alumino silicate adsorbent having a substantially uniform pore diameter of about 5 A., e.g., Linde "Molecular Sieves 5A," maintained at a temperature of about 600° F., and under a pressure of about 75 p.s.i.a. The feed stream passes down through said bed for a period of about five minutes and the straight-chain hydrocarbon components of the feed are selectively adsorbed. The essentially non-adsorbable branched-chain, naphthenic and aromatic hydrocarbons are withdrawn as a raffinite stream from the bottom of adsorbed 126 through line 128, four-way valve 130, line 132, and product cooler 134, and are thence passed to storage via line 136. This stream constitutes the net isomer product of the process; it is produced at a rate of about 550 mols/hr. and has the following composition.

*Isomer Product Stream*

| Component: | Mol percent |
| --- | --- |
| Iso-pentane | 36.7 |
| n-Pentane | 0.2 |
| Iso-hexane | 37.1 |
| n-Hexane | 0.1 |
| Iso-heptane | 3.8 |
| Cyclics and aromatics | 22.1 |
|  | 100.0 |

Simultaneously with the foregoing adsorption operation, the rich adsorbent in second adsorber 142, which likewise contains a 72,600-lb. charge of a 5 A. molecular sieve, is treated to desorb therefrom the straight-chain hydrocarbons which were adsorbed in the previous operational cycle. Adsorber 142 is maintained at substantially the same temperature as adsorber 126, and at the beginning of the desorption step is at substantially the same pressure. The pressure in adsorber 142 is gradually reduced from about 75 p.s.i.a. to about 1 p.s.i.a. as the hydrocarbons in the voids of the bed and the straight-chain hydrocarbons in the pores of the sieves are withdrawn from the top of adsorber 142 via line 144. The reduction of pressure is accomplished by means of compressor 152, valve 138 being closed during this stage of the desorption step. When a suction pressure of about 1 p.s.i.a. is reached, valve 138 is partially opened to allow hydrogen to flow from hydrogen inlet line 162 into the bottom of adsorber 142 via line 164, four-way valve 130, and line 166, at a rate controlled by valve 138. The desorption pressure is allowed to rise only sightly above 1 p.s.i.a., thus producing an upward hydrogen flow stripping action in adsorber 142 which reduces the partial pressure of the adsorbate and substantially completely desorbs the adsorbent. The effluent from adsorber 142, comprising desorbed straight-chain hydrocarbons and the hydrogen stripping gas at a temperature of about 590° F., is withdrawn by vacuum compressor 152 from adsorber 142 via line 144, four-way valve 122, line 146, extract cooler 148, and line 150. The desorption effluent is then passed by compressor 152 via line 154 to isomerization reactor 160.

The foregoing description comprises a single adsorption-desorption operational cycle and is carried out over a period of about five minutes, with the adsorption of the straight-chain hydrocarbon components of the feed stream in line 113 being carried out in a first adsorber 126, and desorption of adsorbed hydrocarbons being simultaneously carried out in second adsorber 142. Upon completion of this cycle of operation, i.e., when the adsorbent in first adsorber 126 approaches saturation with normal paraffin hydrocarbons, the operations are reversed by closing valve 138 and by switching four-way valves 122 and 130 to their opposite position (indicated by dotted lines) by operation of cycle timer operator 172. Such operation places first adsorber 126 into the desorption part of the cycle and simultaneously places second adsorber 142 into the adsorption part of the cycle. In the next succeeding cycle, i.e., in about five minutes' time, the valves are again reversed.

Simultaneously with the foregoing adsorption-desorption operation, the extract stream is passed by vacuum compressor 152 and line 154 to isomerization reactor 160 wherein it is treated to rearrange the molecular structure of the straight-chain hydrocarbons to form branched-chain isomers. Since the vacuum desorption and hydrogen stripping stages of the desorption cycle are carried out over a total elapsed time of only about five minutes, the capacity of compressor 152 and line 154 is sufficient that admixture of the vacuum desorption and stripping effluents takes place therein so the total extract stream which is passed to reactor 160 is of substantially constant composition. In some cases, however, a large tank or gas holder is provided between the desorption step and the isomerization step to insure admixture of the first and second stage desorption effluents. The isomerization reaction is carried out in the presence of a halided platina-on-alumina isomerization catalyst at a temperature of about 750° F. and at a pressure of about 725 p.s.i.a. The liquid hourly space velocity is about 6 and the hydrogen make-up is about 32 s.c.f./bbl. of feed to the isomerization reactor. The additional hydrogen enters isomerization reactor 160 via line 162 to provide any hydrogen make-up required over and above that present in the isomerization feed in line 154. The isomerization reactor effluent is withdrawn through line 106 and is passed to separator 161 wherein the hydrogen is separated for return to the isomerization reactor via line 163. The essentially hydrogen-free isomerizate is withdrawn from separator 161 via line 107 and is passed to stabilizer column 108 operating at a pressure of about 305 p.s.i.a. Within column 108 the light ends of the isomerate are separated by fractional distillation and are taken from the top of column 108 via line 110 and are passed to storage at a rate of about 24 mols/hr. This overhead stream from column 108 has the following composition.

*Stabilizer Overhead Product Composition*

| Component: | Mol percent |
| --- | --- |
| Hydrogen | 31.8 |
| Methane | 15.1 |
| Ethane | 7.9 |
| Propane | 35.3 |
| Iso-butane | 3.1 |
| n-Butane | 5.7 |
| Iso-pentane | 1.0 |
|  | 100.0 |

The bottoms fraction from stabilizer column 108 is withdrawn through line 112 at a rate of about 420 mols/hr. and comprises the stabilized isomerization reactor effluent having a composition as follows.

*Stabilized Reactor Effluent*

| Component: | Mol percent |
|---|---|
| Iso-pentane | 36.1 |
| n-Pentane | 25.0 |
| Iso-hexane | 25.1 |
| n-hexane | 9.4 |
| Iso-heptane | 0.5 |
| Cyclics and aromatics | 3.9 |
| | 100.0 |

It will be noted that the stabilized reactor effluent is recycled in its entirety to the adsorption step, whereby the latter performs the dual function of separating the straight-chain hydrocarbons from the original feed mixture and separating unconverted straight-chain hydrocarbons from the isomerizate. Said unconverted straight-chain hydrocarbons are thus recycled and isomerized to extinction. It will further be noted that while the adsorption and desorption steps are carried out alternately, the isomerization reaction is effected continuously.

While the use of hydrogen to desorb the straight-chain hydrocarbons from the rich adsorbent and use of the resulting hydrogen-hydrocarbon mixture as the feed stream for the isomerization step is of unique advantage where the isomerization is best effected in the presence of hydrogen, such use of hydrogen may be dispensed with where it is not necessary to supply hydrogen to the isomerization reaction. In such intances, the hydrogen stripping gas may be replaced by any gas which is inert with respect to the adsorbent and to the isomerization reactions, e.g., nitrogen, methane, ethane, propane, etc. Preferably such gas has a boiling point at least about 100° F. below that of the hydrocarbon feed mixture. Also, if desired, hydrogen or other suitable gases may be employed for stripping as above explained and the desorption effluent treated to separate the stripping gas therefrom prior to being passed to the isomerization step.

In the foregoing specification and in the appended claims, the material to which the process of the invention is applied is described as a hydrocarbon mixture comprising certain hydrocarbon components. It is to be understood, however, that such term is meant to include mixtures of hydrocarbons which also contain small normally incident amounts of nitrogen, sulfur and oxygen components as well as normally incident inert gases such as nitrogen, hydrogen, carbon dioxide, etc.

Other modifications and adaptations which would occur to one skilled in this particular art are to be included in the spirit and scope of this invention as defined by the following claims.

I claim:

1. The process for upgrading a hydrocarbon mixture comprising a straight-chain and non-straight-chain hydrocarbons boiling within the gasoline boiling range, which comprises (1) contacting said mixture in the vapor phase with a solid granular lean adsorbent essentially comprising a partially dehydrated zeolitic metallo alumino silicate having pores of substantially uniform diameter between about 4.5 A. and about 5.5 A., said contacting being effected at a temperature below about 800° F. and under at least atmospheric pressure, whereby there is obtained a rich adsorbent containing adsorbed straight-chain hydrocarbon components of said mixture and a raffinate product which is rich in non-straight-chain components of said mixture; (2) separating said raffinate product from said rich adsorbent; (3) reducing the pressure on said rich adsorbent to a value between about 0.2 p.s.i.a. and about 2.0 p.s.i.a. in the substantial absence of an added stripping fluid, whereby there is produced a desorbed extract gas comprising desorbed straight-chain hydrocarbons and a partially desorbed adsorbent; (4) contacting said partially desorbed adsorbent with hydrogen in an amount no greater than that required in the isomerization of subsequent step (6) and at a pressure between about 0.2 p.s.i.a. and about 2.0 p.s.i.a., whereby there is obtained at lean adsorbent and an effluent gas comprising hydrogen and straight-chain hydrocarbons; (5) admixing said hydrogen-containing effluent gas with said extract gas; and (6) subjecting the resulting mixture to isomerizing conditions in the presence of an isomerization catalyst, whereby the straight-chain hydrocarbon components of said resulting mixture are isomerized to branched-chain hydrocarbons.

2. A process as defined by claim 1 wherein the said isomerization is carried out at a temperature between about 700° F. and about 1,100° F., at a pressure between about 30 and about 5000 p.s.i.g., at a liquid hourly space velocity between about 1 and about 10, with between about 100 and about 5000 s.c.f. of hydrogen present per barrel of feed to said step (6), and in the presence of a supported noble metal isomerization catalyst.

3. A process as defined by claim 1 in combination with the steps of separating hydrogen from the isomerized product obtained in step (6), and returning at least part of the separated hydrogen to step (6).

4. A process as defined by claim 1 wherein the said adsorbent is a calcium sodium alumino silicate having substantially uniform pores of about 5 A. in diameter.

5. A process as defined by claim 1 wherein said step (1) is effected over a period of time not exceeding about ten minutes and said steps (3) and (4) are together effected over a period of time not exceeding about ten minutes.

6. A process as defined by claim 1 wherein the lean adsorbent obtained in step (4) is recycled back to step (1).

7. A process as defined by claim 1 in combination with the steps of treating the isomerizate obtained in step (6) to separate therefrom components boiling below the gasoline boiling range, whereby there is produced a stabilized isomerizate, and passing said stabilized isomerizate to step (1) whereby the raffinate product separated in step (2) constitutes the net upgraded product of the process.

8. The process for upgrading a hydrocarbon mixture comprising straight-chain and non-straight-chain hydrocarbons of the gasoline boiling range comprising (1) contacting said mixture in the vapor phase with a solid granular lean adsorbent essentially comprising a partially dehydrated zeolitic calcium sodium alumino silicate having substantially uniform pores of about 5 A. in diameter, said contacting being effected at a temperature between about 150° F. and about 650° F. and at a pressure between about 20 p.s.i.a. and about 200 p.s.i.a., whereby there is obtained a rich adsorbent containing adsorbed straight-chain hydrocarbon components of said mixture and a raffinate product which is rich in non-straight-chain components of said mixture; (2) separating said raffinate product from said rich adsorbent; (3) reducing the pressure on said rich adsorbent to a value between about 0.2 p.s.i.a. and about 2 p.s.i.a. in the substantial absence of an added stripping fluid, whereby there is obtained an extract gas comprising desorbed straight-chain hydrocarbons and a partially desorbed adsorbent; (4) contacting said partially desorbed adsorbent with hydrogen in an amount no greater than that required in the isomerization of subsequent step (6) and at a pressure between about 0.2 p.s.i.a. and about 2 p.s.i.a., whereby there is obtained a lean adsorbent and an effluent gas comprising hydrogen and desorbed straight-chain hydrocarbons; (5) admixing said hydrogen-containing effluent gas and said extract gas; and (6) subjecting the resulting admixture to isomerizing conditions in the presence of an isomerization catalyst, whereby the straight-chain hydrocarbon components of said resulting mixture are isomerized to branched-chain hydrocarbons.

9. The process of claim 8 wherein the said step (6) is effected in the presence of a supported noble metal catalyst at a temperature between about 700° F. and about 1100° F., at a pressure between about 30 and about 5000 p.s.i.g., at a liquid hourly space velocity between about one and about ten, and in the presence of between about 100 and about 5000 s.c.f. of hydrogen per barrel of feed to said step (6).

10. The process of claim 8 in combination with the steps of separating hydrogen from the isomerized product obtained in step (6), and returning at least part of the separated hydrogen to step (6).

11. A process as defined by claim 8 wherein steps (1), (2), (3), and (4) are effected at substantially the same temperature.

12. A process as defined by claim 8 wherein said step (1) is effected over a period of time not exceeding about ten minutes, and said steps (3) and (4) are together effected over substantially the same period of time as step (1).

13. A process as defined by claim 8 wherein the lean adsorbent obtained in step (4) is recycled back of step (1).

14. A process as defined by claim 8 in combination with the steps of treating the isomerizate obtained in step (6) to separate therefrom components boiling below the gasoline boiling range, and passing the resulting stabilized isomerizate to step (1), whereby the raffinate product separated in step (2) constitutes the net upgraded product of the process.

15. The process for upgrading a hydrocarbon mixture comprising straight-chain and non-straight-chain hydrocarbons boiling within the gasoline boiling range, which comprises: (1) admixing said mixture with the stabilized isomerizate obtained in subsequent step (10); (2) passing said mixture in the vapor phase through a bed of solid granular lean adsorbent essentially comprising a partially dehydrated zeolitic calcium sodium alumino silicate having substantially uniform pores of about 5 A. in diameter, at a temperature between about 150° F. and about 650° F., and at a pressure between about 20 p.s.i.a. and 200 p.s.i.a., whereby there is obtained a rich adsorbent containing adsorbed straight-chain hydrocarbons and a raffinate product which is rich in non-straight-chain hydrocarbons and which constitutes the net upgraded product of the process; (3) separating said raffinate product from said rich adsorbent; (4) reducing the pressure on said rich adsorbent to a value between about 0.2 p.s.i.a. and about 2 p.s.i.a. in the substantial absence of an added stripping fluid, whereby there is obtained an extract gas comprising desorbed straight-chain hydrocarbons and a partially desorbed adsorbent; (5) passing hydrogen in an amount no greater than that required in th isomerization of subsequent step (8) and through the bed of said partially desorbed adsorbent at a pressure between about 0.2 and about 2 p.s.i.a., whereby there is obtained said lean adsorbent and an effluent gas comprising hydrogen and desorbed straight-chain hydrocarbons; (6) maintaining the temperature during steps (4) and (5) at substantially the same value as that employed in step (2); (7) admixing said extract gas and said effluent gas; (8) contacting the resulting mixture with a separate noble metal isomerization catalyst at a temperature between about 700° F. and about 1100° F., at a pressure between about 30 and about 5000 p.s.i.g., and at a liquid hourly space velocity between about one and about ten, said added hydrogen being sufficient to bring the total amount of hydrogen present to between about 100 and about 5000 s.c.f. per barrel of feed to said step (8), whereby the straight-chain hydrocarbon components of said resulting mixture are isomerized to branched-chain hydrocarbons; (9) separating hydrogen from the isomerizate produced in step (8) and returning at least part of the separated hydrogen to step (8) as said added hydrogen; (10) separating from the essentially hydrogen-free isomerizate light hydrocarbons boiling below the gasoline boiling range to obtain the stabilized isomerizate employed in step (1).

References Cited in the file of this patent

UNITED STATES PATENTS

| | | |
|---|---|---|
| 2,818,449 | Christensen et al. | Dec. 31, 1957 |
| 2,859,170 | Dickens et al. | Nov. 4, 1958 |
| 2,859,256 | Hess et al. | Nov. 4, 1958 |
| 2,886,509 | Christensen et al. | May 12, 1959 |